United States Patent [19]

Miyagi et al.

[11] Patent Number: 4,741,603
[45] Date of Patent: May 3, 1988

[54] ELECTROCHROMIC NONGLARING MIRROR

[75] Inventors: Harutoshi Miyagi, Yokohama; Masazumi Ishikawa, Yokosuka; Yasuyuki Murofushi, Yokohama, all of Japan

[73] Assignee: Nissan Motor Co., Ltd., Japan

[21] Appl. No.: 859,355

[22] Filed: May 5, 1986

[30] Foreign Application Priority Data

May 8, 1985 [JP] Japan .................................. 60-96023

[51] Int. Cl.$^4$ .................................................. G02F 1/01
[52] U.S. Cl. ............................................................... 350/357
[58] Field of Search .............................................. 350/357

[56] References Cited

U.S. PATENT DOCUMENTS

| | | | |
|---|---|---|---|
| 3,807,832 | 4/1974 | Castellion | 350/357 |
| 3,844,636 | 10/1974 | Maricle et al. | 350/357 |
| 4,375,318 | 3/1983 | Giglia et al. | 350/357 |
| 4,403,831 | 9/1983 | Amano | 350/357 X |
| 4,465,339 | 8/1984 | Bauke et al. | 350/357 |
| 4,565,860 | 1/1986 | Murofushi et al. | 528/422 |

FOREIGN PATENT DOCUMENTS

| | | |
|---|---|---|
| 3008768 | 4/1985 | Fed. Rep. of Germany . |
| 3614547 | 11/1986 | Fed. Rep. of Germany . |
| 55-64216 | 5/1980 | Japan . |
| 59-155833 | 9/1984 | Japan . |
| 59-159134 | 9/1984 | Japan . |
| 60-78428 | 5/1985 | Japan . |
| 2148524 | 5/1985 | United Kingdom ........ 350/357 |

Primary Examiner—Gene Wan
Assistant Examiner—James C. Lee
Attorney, Agent, or Firm—Leydig, Voit & Mayer

[57] ABSTRACT

Disclosed is a nonglaring mirror which is an electrochromic device in principle. The mirror comprises a transparent front substrate laid with a transparent first electrode film, a back substrate laid with a second electrode film which is opposite and spaced from the first electrode film, first and second electrochromic layers formed on the first and second electrode films, respectively, and an electrolyte liquid which fills up the space between the two substrates. A reflecting surface is provided by using a transparent sheet as the back substrate and coating the rear surface of the back substrate with a reflecting metal film, or by using a reflecting metal film as the second electrode film. One of the first and second electrochromic layers is formed of a polymer of a conjugated compound, such as substituted or unsubstituted triphenylamine, and the other is formed of a transition metal oxide such as $WO_3$. In the initial state both the first and second electrochromic layers are colorless and transparent. For coloration, the conjugated polymer layer is oxidized and the transition metal oxide layer is reduced. In the colored state the reflectance of the mirror becomes 7–15% and is controllable.

14 Claims, 10 Drawing Sheets

ELECTROCHROMIC NONGLARING MIRROR

BACKGROUND OF THE INVENTION

This invention relates to a nonglaring mirror, i.e. variable reflectance mirror, which is functional as an electrochromic device Known applications of liquid crystals include nonglaring mirrors. That is, a liquid crystal cell having a transparent electrode film on the front side and a reflecting electrode film on the opposite side serves as a nonglaring mirror since reflectance of the mirror can be varied by application of an external electric field to change the state of the liquid crystal confined in a space between the two electrodes to thereby vary the light transmittance of the liquid crystal layer. However, practical use of liquid crystal mirrors is limited because of some disadvantages almost inherent to liquid crystals. In the case of a mirror using the light scattering effect of one type of liquid crystal, visibility of the mirror is significantly marred by bleeding of the reflected image when light transmittance of the liquid crystal is lowered. In the case of a mirror using the phase transition effect of another type of liquid crystal it is difficult to sufficiently lower the reflectance.

Recently much effort has been devoted to research and development of nonglaring mirrors using electrochromic effects. A nonglaring mirror is obtained by providing a highly reflecting surface to an electrochromic cell of the transmissive type. Early proposals include the use of a solution of an organic electrochromic material represented by viologen as the transmittance controlling material confined between a transparent electrode and a reflecting electrode. However, such devices have problems with operating temperatures and service life. Also it is well known to replace the aforementioned electrochromic solution by a combination of a film of a transient metal oxide, such as $WO_3$ which colors blue in a reduced state, deposited on the transparent electrode and an electrolyte solution confined between the two electrodes. However, there is still a problem with the durability of the mirror because it is likely that a portion of the electrolyte solution undergoes an irreversible decomposition reaction at the surface of the electrode opposite the electrochromic oxide film.

In recently proposed electrochromic display devices which seem to be useful as nonglaring mirrors by the provision of a reflecting surface, it is common to coat the oppositely arranged two transparent electrode films with two different kinds of electrochromic materials, respectively. Also in these cases, the space between the two electrodes is filled with an electrolyte liquid. Typical combinations of two kinds of electrochromic materials are as follows.

According to Japanese patent application primary publication No. 55-64216 (1980), the first electrochromic material is a transition metal oxide which colors in a reduced state, such as $WO_3$, and the second is a transition metal hydroxide which colors in an oxidized state, such as $Ir(OH)_x$. A disadvantage of a device or mirror using these electrochromatic materials is that coloring of the mirror is not deep enough because the transition metal hydroxide colors only palely so that the deepness of the mirror color is nearly equivalent to that of the transition metal oxide only.

According to Japanese patent application primary publication No. 59-155833 (1984), the first electrochromic material is a metal hexacyanometalate which is represented by $M_x[M'(CN)_6]_y$ (wherein M and M' are transition metals) and colors in an oxidized state, such as Prussian blue, and the second is a transition metal oxide which colors in a reduced state, such as $WO_3$. There is a problem particular to any device using this combination of electrochromic materials. In producing the device it is inevitable that both the metal hexacyanometalate layer and the transition metal oxide layer are obtained in an oxidized state. That is, the former is in a colored state whereas the latter is in a bleached state. Therefore, it is necessary to perform an electrochemical treatment to reduce one of the two electrochromic layers before using the device. It is often occurs that the initial reduction treatment causes partial decomposition of moisture contained in its electrolyte liquid and oxidation of the electrochromic material in reduced state by the liberated oxygen. This is detrimental to the memory capability of the device. Besides, the decomposition of moisture is accompanied by some bubbling, which mars the appearance of the device. As a solution to this problem, Japanese patent application primary publication No. 59-159134 (1984) proposes to add an auxiliary electrode which comprises a reversibly oxidizable and reducible material. At tne initial reduction treatment the auxiliary electrode is used as the counter electrode. After that the auxiliary electrode serves no purpose. When the device is relatively small in size, the inutile space occupied by the auxiliary electrode becomes considerable compared with the effective coloring area. Besides, the provision of the auxiliary electrode raises the need of widening the distance between the two substrates coated with transparent electrode films and electrochromic layers.

According to Japanese patent application No. 58-188518 (1983), the first electrochromic material is a metal hexacyanometalate, such as Prussian blue, and the second is either a conjugated polymer which becomes lower in light transmittance in a reduced state, such as polypyrrole, or a metal oxyhydroxide which colors in a reduced state, such as $NiO(OH)$. Since the conjugated polymers used in this proposal are colored whether in an oxidized state or in a reduced state, the device using any of such polymers does not become colorless and transparent when bleached and therefore is not suitable for many uses where transparency is required of the device in a bleached state. When a metal oxyhydroxide is used it is difficult to form a sufficiently thick layer of the second electrochromic material, and deepness of coloring of the device is insufficient because of paleness of the color of the metal oxyhydroxide.

For the above described reasons it is difficult to obtain fully practicable and sufficiently efficient nonglaring mirrors by using already developed or proposed electrochromic devices, while there is a strong demand for such nonglaring mirrors and particularly nonglaring rearview mirrors for automobiles.

SUMMARY OF THE INVENTION

It is an object of the present invention to provide an electrochromic nonglaring mirror which is good in transprency in the bleached state and becomes sufficiently low in reflectance upon coloration and can be made compact so as to be useful as, for example, an automotive rearview mirror.

The present invention provides an electrochromic nonglaring mirror, which comprises a transparent front substrate which is coated with a transparent first electrode film, a back substrate which is coated with a second electrode film and is held parallel to the front substrate such that the first and second electrode films are opposite to and spaced from each other, a first electrochromic layer formed on the first electrode film, a second electrochromic layer formed on the second electrode film, means for providing a reflecting surface to the back substrate and an electrolyte liquid in the space between the front and back substrates. This nonglaring mirror is principally characterized in that one of the first and second electrochromic layers is formed of a conjugated polymer which undergoes electrochromic oxidation and reduction and becomes lower in light transmittance when it is in an oxidized state and that the other electrochromic layer is formed of a transition metal oxide which becomes lower in light transmittance when it is in an electrochemically reduced state.

Preferred examples of the conjugated polymer used in the present invention are polymers of substituted or unsubstituted triphenylamine, poly(para-phenylene), poly(N-methylpyrrole) and polyaniline. These conjugated polymers are colorless and transparent, or only palely colored, in electrochemically reduced state and are obtained in reduced state when formed as a coating film on an electrode. When oxidized, these polymers become very low in light transmittance presumably because of a change in the transitional absorption energy of $\pi$-electron by double bond or unpaired electron. Among the above named conjugated polymers, polytriphenylamine and polymers of substituted triphenylamine are most favorable because these polymers become almost perfectly colorless and transparent when reduced and can be colored and bleached by a relatively low drive voltage.

The electrochromic layer of a transition metal oxide such as $WO_3$ is obtained in an oxidized state and, therefore, in a colorless and transparent state. Accordingly there is no need for an oxidizing or reducing treatment before using a mirror according to the invention. Naturally there is no need of incorporating an auxiliary electrode in the mirror. By application of a suitable voltage to oxidize the conjugated polymer layer and reduce the transition metal oxide layer, both of these two electrochromic layers assume color and become low in light transmittance, so that the reflectance of the mirror becomes sufficiently low. When the electrochromic layers have thicknesses suitable for possession of good resistance to peel, such as 500–1500 Å in the case of a polytriphenylamine layer and 3000–5000 Å in the case of a $WO_3$ layer, the reflectance of the mirror in the colored state can be controlled to about 7–15%. Such values of lowered-reflectance are almost ideal for a nonglaring mirror. In conventional nonglaring mirrors on the principle of prism, lowered reflectance is about 4%. A nonglaring mirror of the invention can be made compact and is stable in the electrochromic effects. Accordingly this nonglaring mirror is useful for many purposes including rearview mirrors for automobiles.

In a nonglaring mirror according to the invention, the reflecting surface is provided by coating the rear surface of the back substrate on condition that the back substrate is transparent, or by using a reflecting metal film as the second electrode film which is laid with one of the electrochromic materials.

DESCRIPTION OF THE PREFERRED EMBODIMENTS

Figure 1:
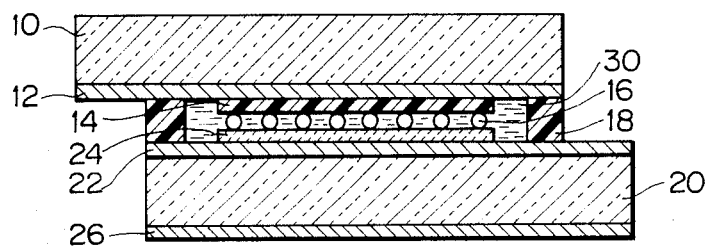
FIG. 1 is a sectional and schematic illustration of an electrochromic nonglaring mirror as a first embodiment of the invention.

FIG. 1 shows the fundamental construction of a nonglaring mirror as a first embodiment of the invention. In principle, this mirror is an electrochromic device of the transmissive type.

This device has front and back substrates 10 and 20 both of which are transparent. A transparent. electrode film 12 is deposited on the rear or inside surface of the front substrate 10, and a first electrochromic layer 14 is formed, as a film on the electrode film 12. For this layer 14 the electrochromic material is a conjugated polymer, which undergoes electrochemical oxidation-reduction and becomes low in light transmittance when oxidized. Another transparent electrode film 22 is deposited on the inside surface of the back substrate 20, and a second electrochromic layer 24 is formed, as a film, on this electrode film 22. The material of this electrochromic layer 24 is a transition metal oxide which assumes color and becomes low in light transmittance when electrochemically reduced. A lustrous metal film 26 is deposited on the outside surface of the back substrate 20 and serves as a means for providing a highly reflectrng surface necessary for a mirror. A transparent spacer 16 is used to keep a predetermined short distance between the first and second electrochromic layers 14 and 24.

The spacer 16 is required to leave the electrochromic layers 14, 24 uncovered over as large an area as possible. In this embodiment the spacer 16 consists of a number of tiny glass spheres uniform in diameter. The two transparent substrates 10 and 20 are held spaced from each other by a thin layer 18 of a sealing material, which is applied peripherally of the substrates 10, 20 so as to surround the electrochromic layers 14, 24. The spaces defined between the two substrates 10 and 20 by the peripheral seal 18 is filled with an electrolyte liquid 30.

Usually the transparent electrode films 12 and 22 are formed of $SnO_2$ or $In_2O_3$. The transition metal oxide of the second electrochromic layer 24 can be selected from, for example, $WO_3$, $MoO_3$, $Nb_2O_5$, $Cr_2O_3$, $Ta_2O_5$, $TiO_2$, $Fe_2O_3$ and AgO. In most cases $WO_3$ is preferable.

Conjugated polymers useful for the first electrochromic layer 14 are mentioned hereinbefore. It is preferred to use a polymer ootained by using triphenylamine or its derivative represented by the following general formula as the starting material.

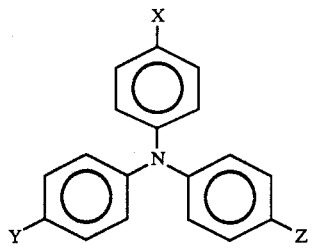

wherein X, Y and Z each represent a hydrogen atom, a halogen atom, a hydroxyl group, an alkyl group, an alkoxyl group, an acyl group, an allyl group, a vinyl group or a vinylidene group.

A film of such a polymer can be formed on the electrode 12 by using one of the following methods.

(1) First a coating film of a selected monomer represented by the above general formula is formed on the electrode by a suitable method such as a solution coating method. Then the monomer in film form is polymerized by using a suitable oxidizer such as iodine, antimony pentafluoride, arsenic pentafluoride or ferric oxide to thereby accomplish fixing of a desired polymer film onto the electrode.

(2) The selected monomer is polymerized by an ordinary polymerization method, and a solution of the obtained polymer is applied to the electrode so as to form a coating film. After that the polymer in film form is caused to undergo cross-linking reaction by using an oxidizer which can be selected from the above named ones.

(3) The selected monomer or its polymer is dissolved in a suitable electrolyte liquid, and an electrolytic polymerization operation is carried out to thereby deposit a desired polymer film on the electrode.

(4) This method can be employed when the selected monomer has an unsaturated hydrocarbon group such as allyl group or vinyl group as X, Y and/or Z in the above general formula. First, a film of the monomer is formed on the electrode by a suitable method such as a solution coating method. Then the monomer in film form is polymerized by heating or by irradiation with ultraviolet rays to thereby accomplish fixing of a desired polymer film to the electrode.

The electrolyte liquid 30 is a solution of a supporting electrolyte, which is usually an alkali metal compound such as $LiClO_4$, $LiBF_4$, $LiPF_6$, $KClO_4$, $KBF_4$ or $KPF_6$, in an organic solvent such as acetonitrile, propylene carbonate or N,N'-dimethylformamide or in water, or in a mixed solvent which may contain water.

The metal material of the reflective film 26 is not limited. It is possible to use any metal that provides a mirror surface. In practice it is convenient to use aluminum, silver or chromium.

EXAMPLE 1

A mirror of the construction shown in FIG. 1 was produced in the following manner.

A glass sheet having a thickness of 1 mm was used as the transparent substrates 10 and 20. Each of the transparent electrode films 12 and 22 was formed by vacuum deposition of $SnO_2$ onto the substrate surface to a thickness of 3000 Å.

The material of the first electrochromic layer 14 was a polymer of 4,4'-dichlorotriphenylamine, which was polymerized by a Grignard reaction and had an average molecular weight of about 2000. As to the polymerization method, reference is made to U.S. Pat. No. 4,565,860. The polymer was dissolved in chloroform in a concentration of 15 g/l, and the solution was applied to the surface of the transparent electrode film 12 by a spin-coating method. After drying and degassing the polymer coating film, the front substrate 10 was placed in a vessel filled with iodine vapor and heated at 100° C. for 2 hr to thereby accomplish cross-linking of the polymer on the transparent electrode 12. The thus formed first electrochromic layer 14 was a thin film having a thickness of about 1000 Å.

On the back side of the transparent substrate 20, the reflective metal coating film 26 was formed by sputtering of Al to a film thickness of about 1500 Å. After that the second electrochromic layer 24 was formed by vacuum deposition of $WO_3$ onto the transparent electrode film 22 to a thickness of about 4000 Å.

The front substrate 10 was placed upside down, and a number of transparent glass spheres having a diameter of 40 μm were distributed on the electrochromic layer 14 at a density of about 15 spheres per squarecentimeter. The glass spheres were used to constitute the spacer 16. To form the peripheral seal 18, an epoxy base adhesive was applied by screen printing to the marginal regions of the transparent electrode 22 on the back substrate 20 so as to leave an opening to be used for intake of the electrolyte liquid. Then the back substrate 20 was placed on the front substrate 10, and the adhesive used as the seal 18 was cured under an adequate pressure. The electrolyte liquid 30 was prepared by dissolving 1 mole of $LiClO_4$ in 1 liter of propylene carbonate to which about 3 wt.% of water was added. The electrolyte liquid 30 was injected through the aforementioned opening into the space in the nearly completed mirror, and the opening was closed with the epoxy base adhesive.

The film of the polymer of 4,4'-dichlorotriphenylamine formed as the first electrochromic layer 14 was initially colorless and transparent since the polymer, as formed, was in an electrochemically reduced state. Also, the film 24 of $WO_3$ was initially colorless and transparent since $WO_3$ was in oxidized state. Therefore, the mirror of Example 1 exhibited high reflectance upon completion of the above described manufacturing process. Unlike a mirror using a combination of Prussian blue and $WO_3$, the mirror of Example 1 does not need an initial reduction treatment and, hence, does not need to include an auxiliary electrode for such an initial treatment. In this case the reflectance of the mirror in the initial state was about 70%.

Figure 2:
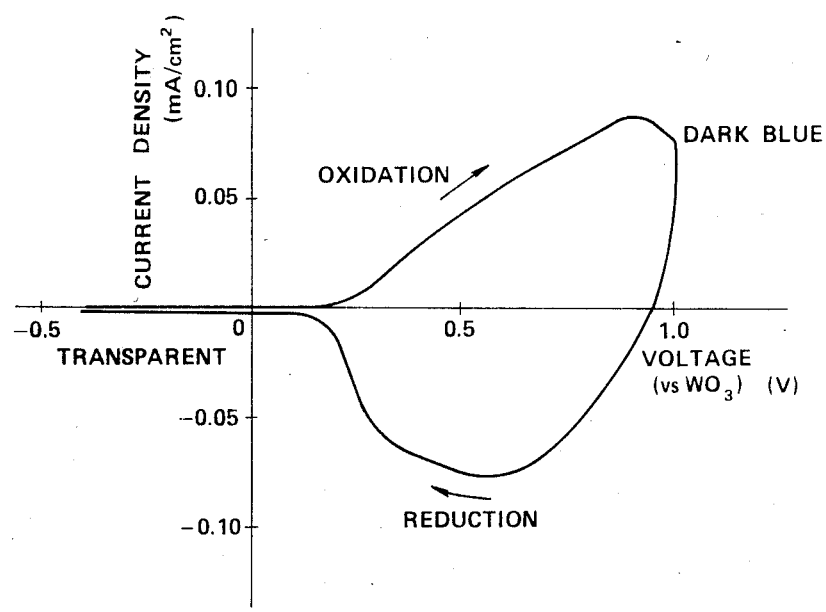
FIG. 2 is a cyclic voltamogram obtained by testing a nonglaring mirror produced in Example 1 of the invention.

The electrochromic function of the mirror of Example 1 was examined by voltametry. The electrode 22 coated with the $WO_3$ film 24 was made the counter electrode, and the scan rate of the potential was 10 mV/sec. FIG. 2 shows a cyclic voltamogram of the conjugated polymer film 14 on the front electrode 12. As can be seen, the mirror functioned as a good electrochromic device. In the case of an oxidation reaction with respect to the conjugated polymer film 14, the mirror colored dark blue at about 0.9 V (vs $WO_3$) so that the reflectance decreased to about 10%. In the case of a reduction reaction, the colorless and transparent state was resumed at about 0 V (vs $WO_3$).

The initial characteristics of this mirror as a nonglaring mirror using electrochromic effects were as follows. In the tested mirror samples, the effective mirror area was 50 $cm^2$.

Figure 3:
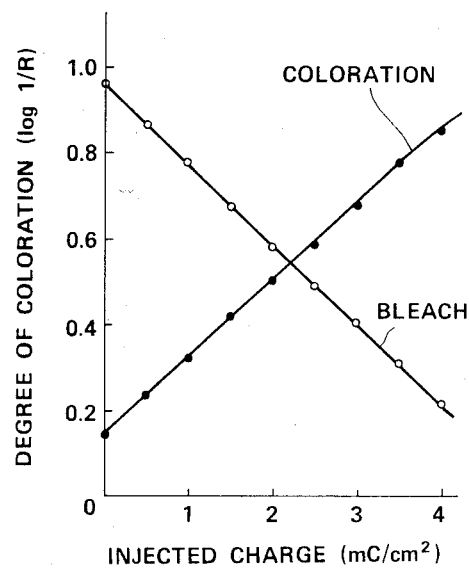
FIG. 3 is a graph showing the coloring and bleaching characterstics of the same mirror.

With respect to the conjugated polymer film 14, the relationship between the quantity of the injected charge and the degree of coloration was as shown in FIG. 3, assuming that $log(1/R)$, where R is reflectance, can be taken as the degree of coloration. Since the degree of coloration is proportional to the injected charge, it is apparent that the reflectance in the colored state can be further lowered by increasing the thickness of the conjugated polymer film 14 to thereby increase the quantity of injectable charge. Also it is apparaent that the reflectance can be set at a desired level by controlling the quantity of the injected charge.

Figure 4:
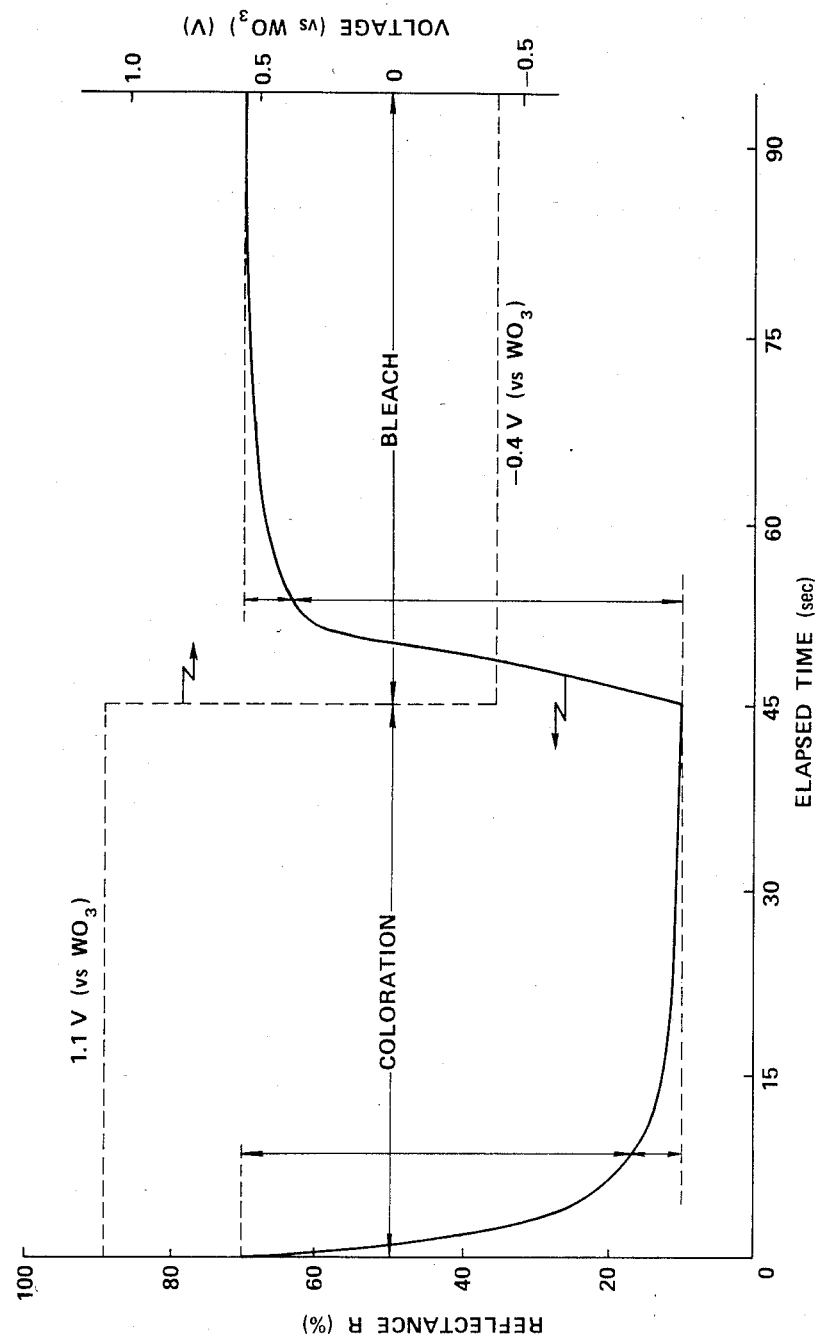
FIG. 4 is a chart showing the manner of a change in the reflectance of the same mirror with the lapse of time when a constant voltage is applied.
Figure 5:
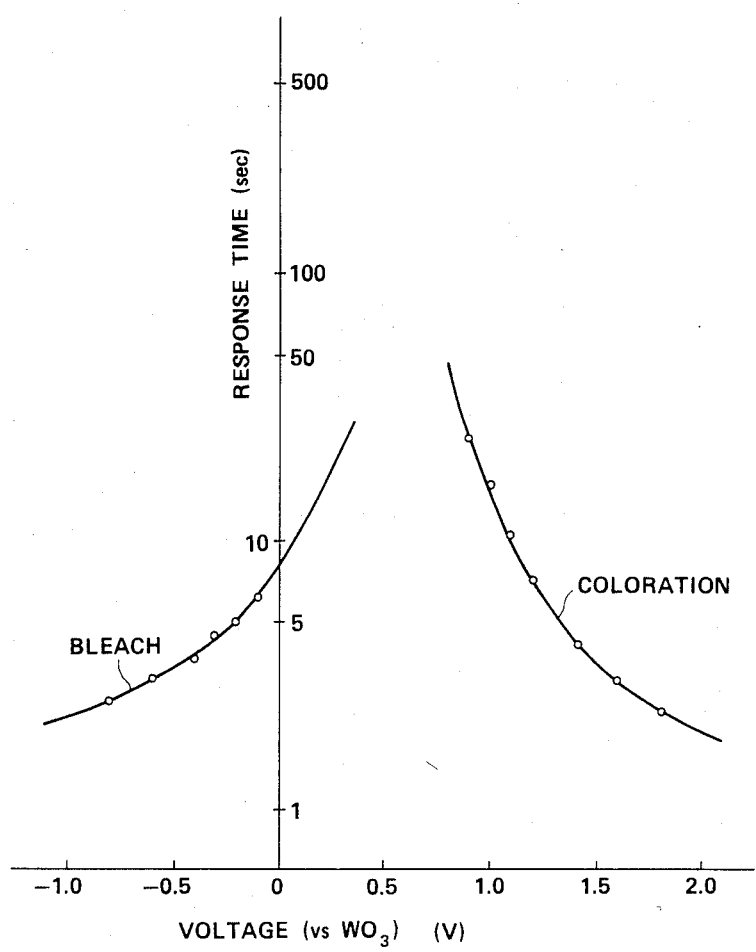
FIG. 5 is a graph showing the relationship between voltage applied to the same mirror and response time of the mirror.

To evaluate the response time, the manner of change in reflectance at a constant electrode potential was measured for both oxidation potential and reduction potential. FIG. 4 shows the obtained results. In practice, it is permissible to assume that coloration or bleaching is complete when the amount of change in reflectance reaches about 90% of the maximum amount of change. It was found that the quantity of the injected or extracted charge required for such an extent of change in reflectance is about 4 $mC/cm^2$. A length of time required for injection or extraction of such a quantity of charge is taken as coloration time or bleaching time. The dependence of the coloration time and bleaching time on the electrode potential was measured to be as shown in FIG. 5. From FIG. 5 it is understood that the response time of this nonglaring mirror becomes about 4 sec by applying a voltage of about 1.45 V (vs $WO_3$)to the front electrode 12 for coloration and a voltage of about $-0.35$ V (vs $WO_3$) for bleaching. In the colored state the reflectance was about 10%.

Figure 6:
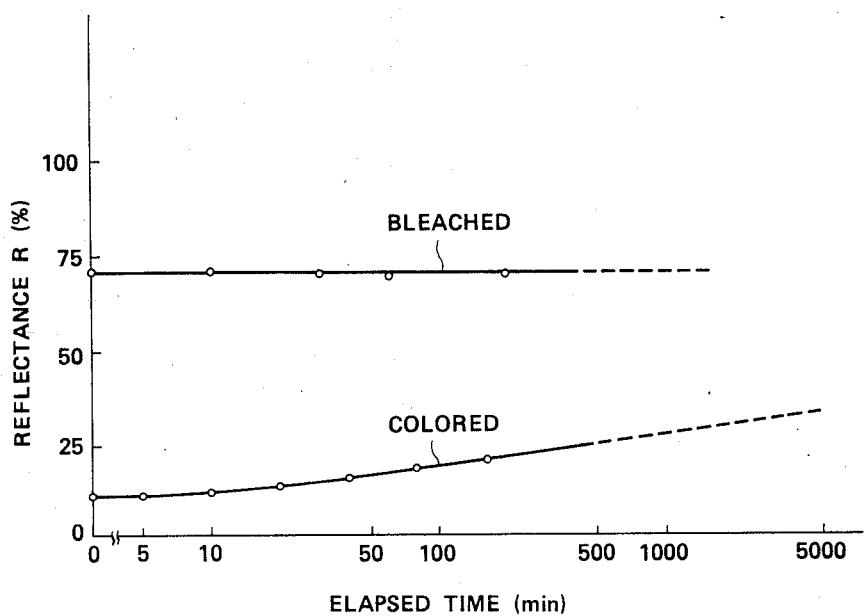
FIG. 6 is a graph showing the manner of a change in the reflectance of the same mirror with the lapse of time after coloration or bleaching.

The open-circuit memory capabilities were as shown in FIG. 6. When the electrochromic layers 14, 24 are left in Colored state, the reflectance slowly varies as time passes. The bleaching state is very stable with little change in reflectance.

Figure 7:
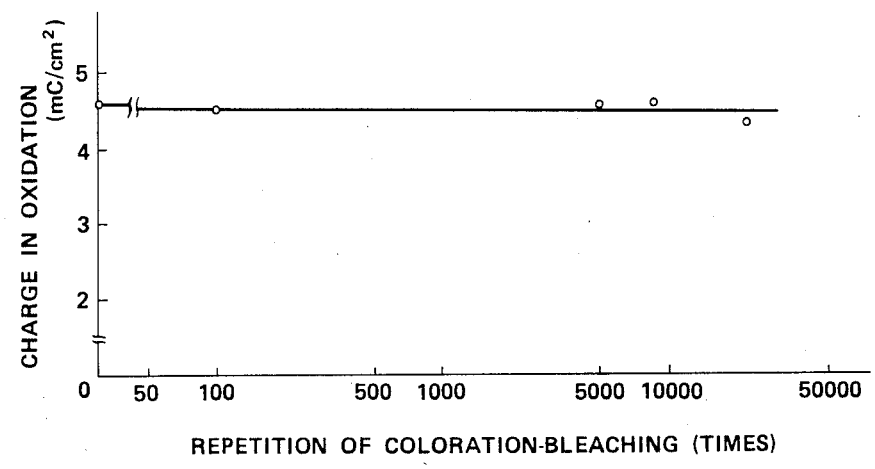
FIG. 7 is a graph showing the degree of stableness of the coloring and bleaching reaction in the same mirror.
Figure 9:
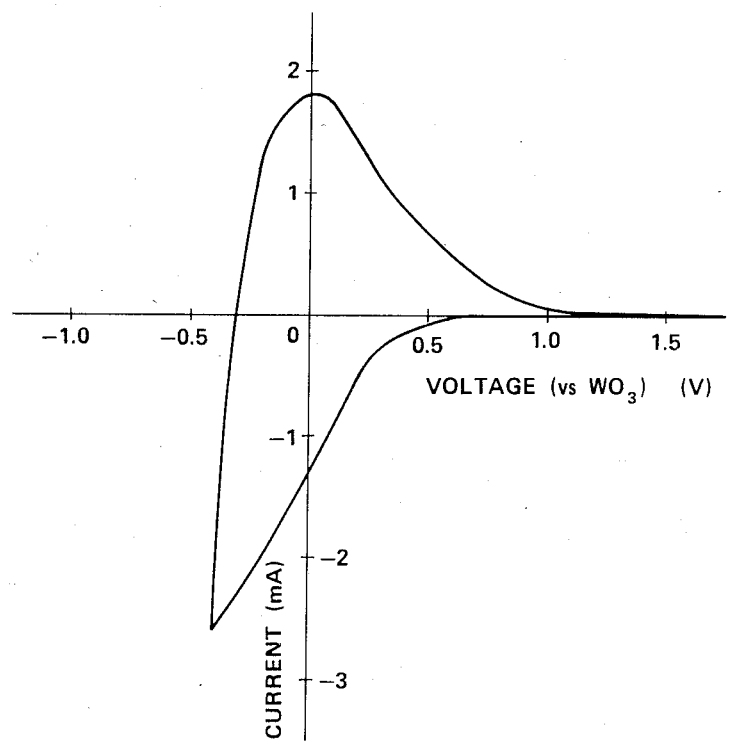
FIGS. 9–13 are voltamograms obtained by testing five kinds of metal electrodes each coated with $WO_3$.
Figure 10:
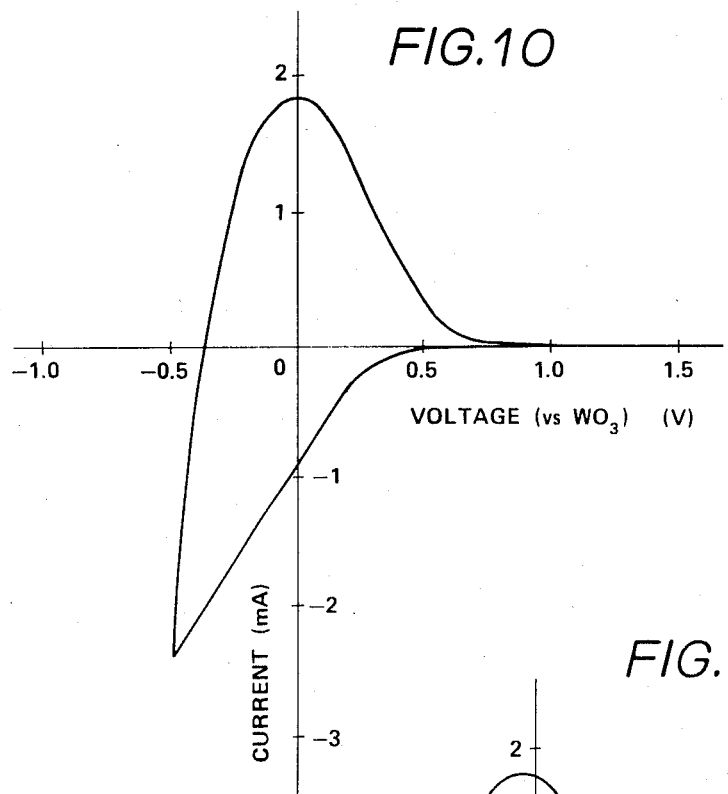
Figure 11:
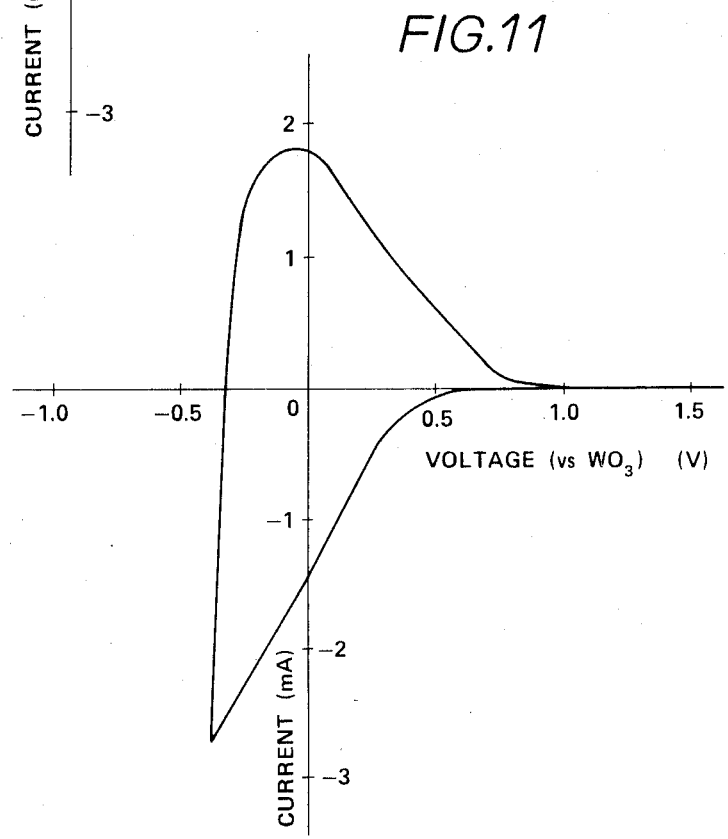
Figure 12:
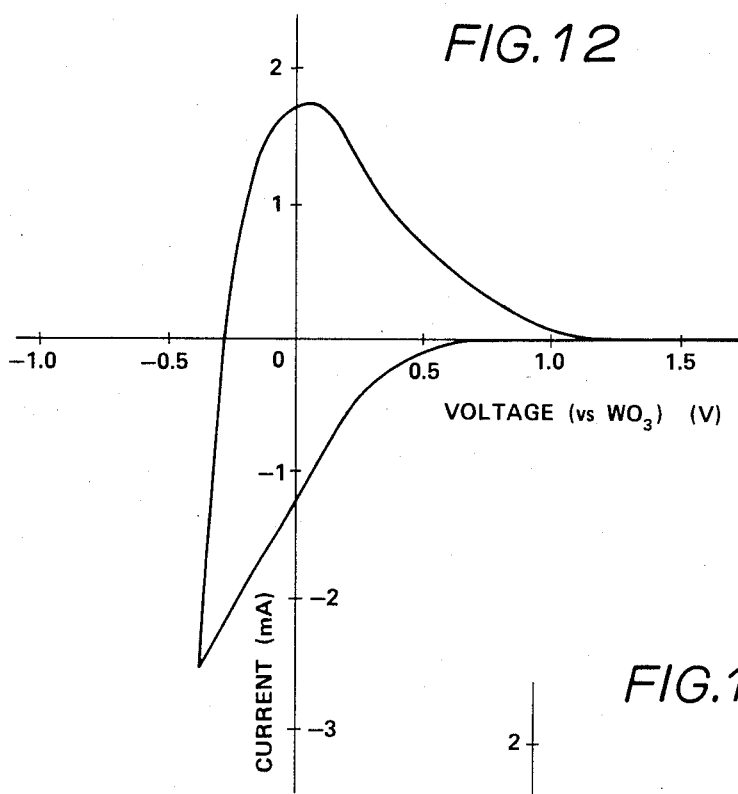

Reproducibility of the oxidation-reduction reaction was examined by repeating the sequence of keeping the conjugated polymer film 14 on the front electrode 12 at a coloring potential of 1.1 V (vs $WO_3$) for 15 sec and then at a bleaching potential of $-0.4$ V (vs $WO_3$) for 90 sec. During repetition of this sequence of the quantity of charge injected at oxidation was measured at suitable intervals. As shown in FIG. 7, the oxidation-reduction reaction was stably reproducible so that a decrease in the quantity of the injected charge was almost negligibly small even when the sequential coloration and bleaching were repeated more than 30000 times.

EXAMPLE 2

The mirror of Example 1 was modified only in that a polymer of 4,4'-dibromo-4"-methyltriphenylamine, which was prepared by the method shown in U.S. Pat. No. 4,565,860 and had an average molecular weight of about 3000, was used as the material of the first electrochromic layer 14. The obtained mirror was comparable to the mirror of Example 1 in variability and controllability of reflectance.

EXAMPLE 3

The mirror of Example 1 was modified only in that a polymer of 4,4'-dibromo-4"-methoxytriphenylamine, which was prepared by the method shown in U.S. Pat. No. 4,565,860 and had an average molecular weight of about 5000, was used as the material of the first electrochromic layer 14. The reflectance of the obtained mirror was variable within the range of from 65% to 15%. Therefore, this mirror too can be called a nonglaring mirror.

EXAMPLE 4

As the sole modification of the mirror of Example 1, the first electrochromic layer 14 was formed in the following manner.

Triphenylamine was dissolved in chloroform in a concentration of 15 g/l, and the solution was spin-coated on the surface of the transparent electrode film 12. After drying and degassing the coating film, the front substrate 10 was placed in a vessel filled with iodine vapor and heated at 100° C. for 2 hr to thereby polymerize triphenylamine on the transparent electrode 12. Also in this case the thickness of the polymer film formed as the first electrochromic layer 14 was about 1000 Å.

The obtained mirror was comparable to the mirror of Example 1 in electrochromic functions and in variability and controllability of reflectance.

Figure 8:
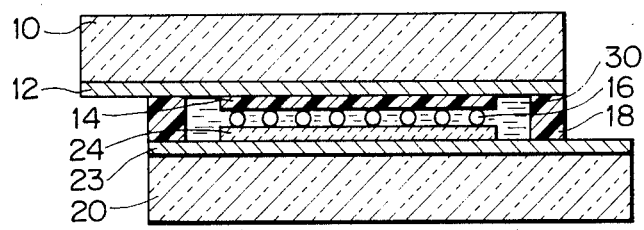
FIG. 8 is a sectional and schematic illustration of an electrochromic nonglaring mirror as a second embodiment of the invention.

FIG. 8 shows the fundamental construction of a nonglaring mirror as a second embodiment of the invention. In principle, this mirror does not differ from the mirror of FIG. 1.

The distinction of the mirror of FIG. 8 resides in the manner of providing a highly reflecting surface to the back substrate 20. In this case the inside surface of the back substrate 20 is coated with a highly reflecting electrode film 23 instead of the transparent electrode film 22 in FIG. 1. Therefore. the back substrate 20 need not to be transparent, and the reflecting metal coating film 26 shown in FIG. 1 is omitted. Otherwise, the mirror or electrochromic device of FIG. 8 is identical with the mirror of FIG. 1 in both construction and materials.

The material of the reflecting electrode film 23 is a metal that is electrochemically stable. It is preferred to use one of a group of metals whose atomic numbers are in the range from 73 to 79, i.e. tantalum, tungsten, rhenium, osmium, iridium, platinum and gold. If tungsten is used, it is easy to form an electrochromic layer of $WO_3$ by oxidizing the surface of the reflecting electrode film. Among these metals, Ta, W, Pt and Au were each tested as an electrode material in an electrolytic cell. For comparison. Mo was tested similarly. The test was conducted in the following manner.

Figure 13:
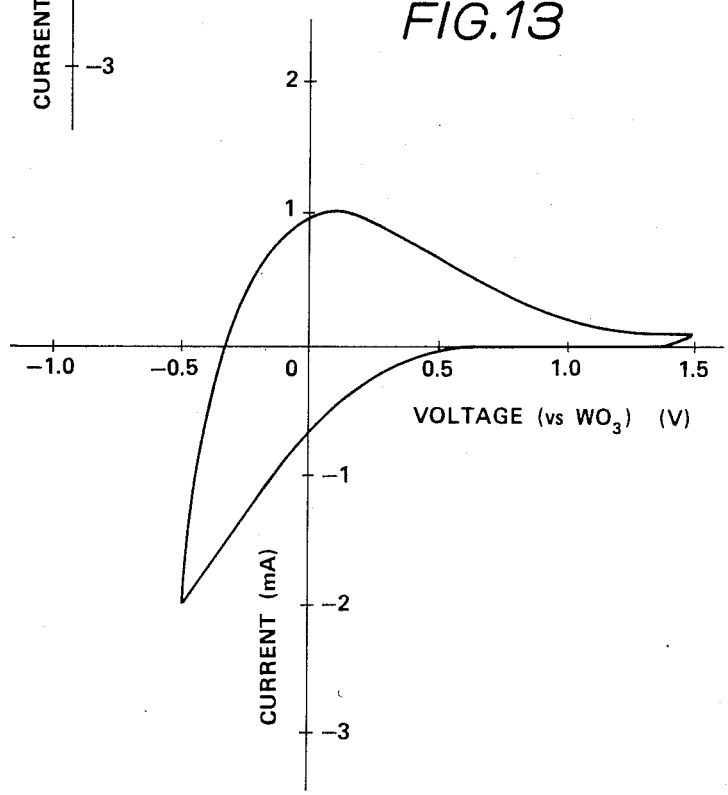

Each of the above named five kinds of metals was deposited on a glass sheet by sputtering to thereby form a reflecting electrode film, and a film of WO$_3$ was formed on each reflecting electrode film by sputtering. Each sample was immersed in an electrolyte liquid prepared by dissolving 1 mole of LiClO$_4$ in 1 liter of propylene carbonate, and the voltage-current characteristic of the sample electrode was measured in a nitrogen gas atmosphere by using a platinum wire as the counter electrode and a Ag/AgCl electrode as the reference electrode. The scan rate of the voltage at the sample electrode (vs Ag/AgCl) was 10 mV/sec. FIGS. 9-12 show cyclic voltamograms obtained by testing the WO$_3$-coated electrodes of Ta, W, Pt and Au. respectively. In every case the oxidation-reduction reaction of WO$_3$ was accompanied by no side reaction attributed to the underlying metal film, and dissolution of the metal film into the electrolyte liquid did not take place. By this test, Ta, W, Pt and Au all proved to be good electrode materials. In the case of the sample of the Mo electrode film the cyclic voltamogram was as shown in FIG. 13. In this case some lowering of the rate of oxidation reaction was observed, and bleaching of the WO$_3$ film remained incomplete.

In the nonglaring mirror of FIG. 8 having the reflecting electrode 23, the distance between the opposite two electrodes 12 and 23 is a matter of importance. If the distance is inappropriate, ghost images or double images will appear when the electrochromic layers 14, 24 are colored so that reflection from the transparent electrode 12 becomes appreciable whereas the reflectance of the opposite electrode 23 becomes lower. For example, if the distance between the two electrodes is only about 10 μm as is usual in conventional liquid crystal devices, incidence of homochromatic light such as the light from sodium lamps used in tunnels and service stations might cause appearance of ghost images in a striped pattern, which render the mirror unsightly.

In general, reflection of light from two surfaces fixed at a distance D from each other results in interference of the reflected light waves. According to the Bragg's formula, the light waves reflected from the two surfaces intensify each other when the equation (1) is satisifed and weaken each other when the equation (2) is satisified.

$$2D \cos \theta = n\lambda \quad (1)$$

$$2D \cos \theta = (n+\tfrac{1}{2})\theta \quad (2)$$

wherein $\theta$ is the angle of reflection, $\lambda$ is the wavelength of the incident light, and n is an integer.

Figure 14:
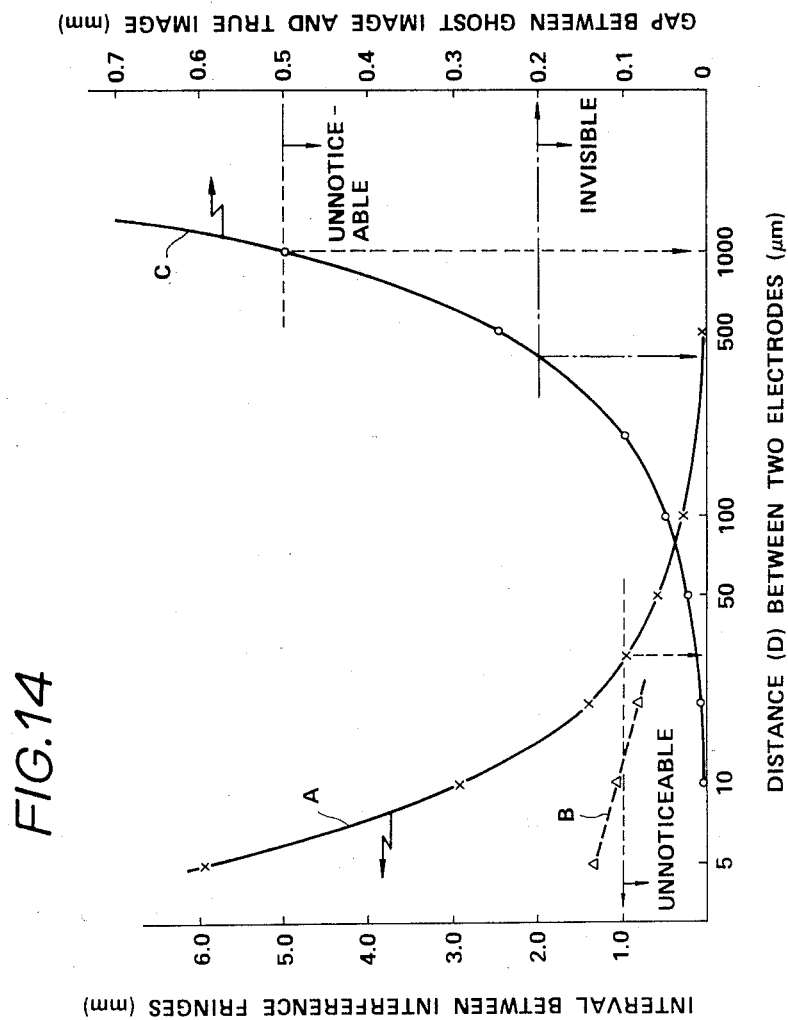
FIG. 14 is a chart for explanation of dependence of the interval between interference fringes appearing in a mirror having a transparent electrode film and a reflecting electrode film on the distance between the two electrode films and also dependence of the gap between a ghost image and true image in the same mirror on the distance between the two electrode films.

Since n is indefinite. there are many values of reflection angle $\theta$ that satisfy these equations. This is the reason for the appearance of so-called interference fringes. In a series of interference fringes which may appear in the mirror of FIG. 8, the interval between two adjacent fringes is determined if the wavelength $\lambda$ of the incident light, distance D between the two electrodes 12 and 23 and the distance L of the observer from the reflecting surface are given together with the value of a factor F which represents the degree of waviness of the reflecting surface. Assuming that $\lambda$ is 6000 Å, that L is 50 cm, that $\theta$ is 30° and that errors in the distance D are 10% per length of 1 cm, the relationship between the distance D between the two electrodes 12 and 23 and the interval between the interference fringes was found by calculation. (If, for example, the distance D is 10 μm and errors in D are as assumed above, the value of the aforementioned factor F is 1 μm/1 cm.) The result of the calculation is represented by the curve A in FIG. 14. Under the assumed conditions the interference fringes become almost unnoticeable by the naked eye when the interval between the fringes is narrower than about 1 mm. Similar analysis was made also for the mirror of FIG. 1 wherein the reflecting surface (26) is on the outside of the back substrate 20. The thickness of the transparent substrate 20 was assumed to be 1 mm and the angle of reflection to the observer to be about 5°. That is, in this case the interference fringes are almost invisible. In a practical sense, even a homochromatic light contains wavelengths over a certain range. Therefore, the interference fringes overlap each other and become unnoticeable as the interval between the fringes narrows.

From the above facts, it is understood that interference fringes in a mirror according to the invention can be rendered unnoticeable by sufficiently widening the distance between the front and back substrates 10 and 20 or by forming the reflecting surface (26) on the outside surface of the transparent back substrate 20. In the case of using the reflecting electrode film 23 as shown in FIG. 8, it is important to appropriately determine the distance between the two substrates, i.e. distance D between the two electrodes 12 and 23. The gap between a ghost image and a true image also depends on the distance D, as represented by the curve C in FIG. 14. Under the conditions assumed hereinbefore, a ghost image in the mirror of FIG. 8 becomes almost unnoticeable by the naked eye when the gap between the ghost image and the true image is narrower than about 0.5 mm and becomes invisible when the gap is narrower than about 0.2 mm. In view of the relationship shown in FIG. 14. it is suitable to determine the distance D between the two electrodes 12 and 23 in the mirror of FIG. 8 so as to fall in the range of from 30 to 1000 μm, and preferably in the range of from 30 to 504 μm, for the purpose of rendering both interference fringes and ghost images unnoticeable.

EXAMPLE 5

A mirror of the construction shown in FIG. 8 was produced in the following manner.

A glass sheet having a thickness of 1 mm was used as the front and back substrates 10 and 20. On the front substrate 10, the transparent electrode film 12 was formed by the same method as in Example 1.

The material of the first electrochromic layer 14 was a polymer of unsubstituted triphenylamine polymerized by a Grignard reaction. The polymer was dissolved in chloroform in a concentration of 15 g/l, and the solution was spin-coated on the electrode film 12. In iodine vapor the coating film of the polymer was heated at 100° C. for 2 hr to thereby fix a cross-linked polytriphenylamine film 14 to the transparent electrode film 12. The thickness of the polymer film 14 was about 1200 Å.

On the back substrate 20, the reflecting electrode film 23 was formed by depositing Pt to a thickness of about 1000 Å by sputtering. Then the second electrochromic layer 24 was formed by vacuum deposition of WO$_3$ onto the reflecting electrode film 23 to a thickness of about 4000 Å. After that the assembly of the mirror including the spacer (glass spheres) 16 and seal 18 was carried out in the same manner as in Example 1, and the electrolyte liquid 30 mentioned in Example 1 was introduced before completely sealing the assembly.

In the obtained mirror, both the conjugated polymer film 14 and the WO3 film 24 were initially colorless and transparent. The reflectance of the mirror in the initial state was about 60%. This mirror functioned as a good electrochromic device and served as a nonglaring mirror. That is, the mirror colored dark blue when a voltage of 0.9 V (vs WO3) was applied to the electrode 12 coated with polytriphenylamine 14. In the colored state the reflectance of the mirror was about 7%. The mirror resumed the colorless and transparent state when the two electrodes 12 and 23 were short-circuited.

By visual observation of the mirror surfaces, ghost images were almost unnoticeable. When the mirror was exposed to light from a sodium lamp the appearance of interference fringes was almost unnoticeable since the interval between the fringes was narrower than 1 mm.

EXAMPLE 6

As the sole modification of the mirror of Example 5, the first electrochromic layer 14 was formed in the same manner as in Example 1 by using a polymer of 4,4'-dichlorotriphenylamine.

In the obtained mirror the reflectance was variable over the range of from about 50% to about 8%, and response of this mirror to driving voltages was better than that of the mirror of Example 5 by about 20%.

In any of the foregoing examples, reversing of the two electrochromic layers by using WO3 as the first electrochromic layer 14 and a polymer of substituted or unsubstituted triphenylamine as the second electrochromic layer 24 resulted in no difference in the above described electrochromic functions of each mirror.

Figure 15:
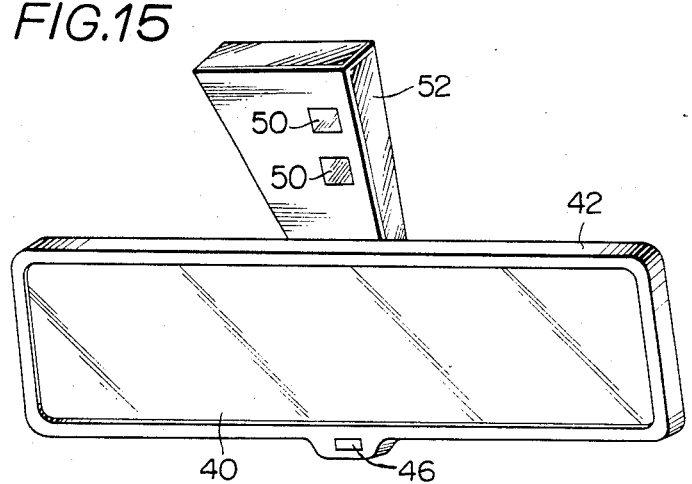
FIG. 15 is a perspective view of an automotive rearview mirror unit using an electrochromic nonglaring mirror according to the invention.
Figure 16:
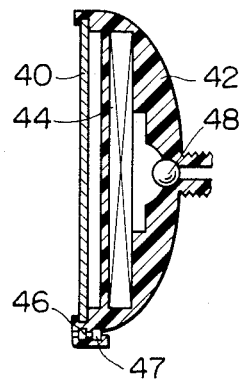
FIG. 16 is a sectional view of the rearview mirror unit of FIG. 15.

FIGS. 15 and 16 show a rearview mirror unit for an automobile, in which an electrochromic nonglaring mirror according to the invention is used. The mirror 40 and a circuit board 44 are fitted in a mirror housing 42. Besides, a light sensor 46 for interior light and another light sensor 47 for exterior light are fitted in the housing 42. Switches 50 for electrochromic functioning of the mirror 40 are disposed in a stay 52 which supports the mirror housing 42. Numeral 48 indicates a pivot for adjusting the tilt of the mirror housing 42.

Figure 17:
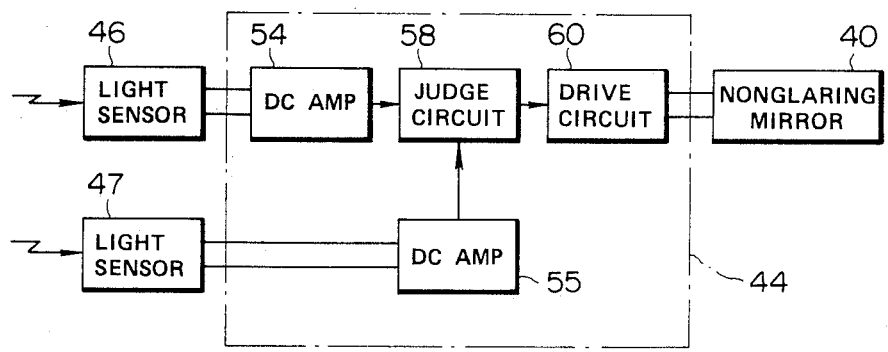
FIG. 17 is a circuit diagram showing a circuit to drive the electrochromic nonglaring mirror in the mirror unit of FIGS. 15 and 16.

FIG. 17 shows an example of the circuit installed in the mirror housing 42. Essentially, this circuit is comprised of a judgment circuit 58 which receives signals from the two light sensors 46 and 47 via two DC amplifiers 54 and 55, respectively, and determines an optimum value of the reflectance of the mirror 40, and a drive circuit 60 which applies a drive voltage to the mirror 40 in response to the output of the judgment circuit 58.

What is claimed is:

1. An electrochromic nonglaring mirror, comprising:
   a transparent front substrate which is coated with a transparent first electrode film, and a back substrate which is coated with a second electrode film, said back substrate positioned parallel to said front substrate such that the first and second electrode films are opposite to and spaced from each other;
   a first electrochromic layer formed on said first electrode film and a second electrochromic layer formed on said second electrode film;
   means for providing a reflecting surface to said back substrate; and
   an electrolyte liquid provided in the space between said front and back substrates;
   one of said first and second electrochromic layers being formed from a conjugated polymer which undergoes electrochemical oxidation and reduction and becomes lower in light transmittance when it is in an oxidized state, said conjugated polymer being a polymer prepared from a compound represented by the following general formula:

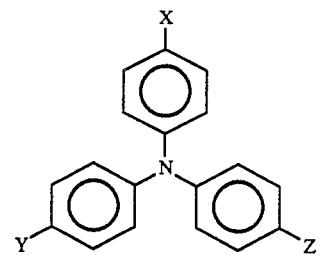

wherein X, Y and Z each represent a hydrogen atom, a halogen atom, a hydroxyl group, an alkyl group, an alkoxyl group, an acyl group, an allyl group, a vinyl group or a vinylidene group, the other electrochromic layer being formed of a transition metal oxide which becomes lower in light transmittance when it is in an electrochemically reduced state.

2. A mirror according to claim 1, wherein said conjugated polymer is selected from the group consisting of polytriphenylamine, poly(4,4'-dichlorotriphenylamine), poly(4,4'-dibromo-4'-methyltriphenylamine) and poly(4,4'-dibromo-4"-methoxytriphenylamine).

3. A mirror according to claim 1, wherein said transition metal oxide is selected from the group consisting of WO3, MoO3, Nb2O5, Cr2O3, Ta2O5, TiO2, Fe2O3 and AgO.

4. A mirror according to claim 1 wherein both said back substrate and said second electrode film are transparent, said means for providing a reflecting surface comprises a reflecting metal film coated on the rear surface of said back substrate.

5. A mirror according to claim 1 wherein said second electrode film and said means comprise a reflecting metal film.

6. A mirror according to claim 5, wherein the material of said second electrode film is selected from the group consisting of Ta, W, Re, Os, Ir, Pt and Au.

7. A mirror according to claim 5, wherein the distance between said first and second electrode films is in the range from 30 to 1000 μm.

8. A mirror according to claim 7, wherein said distance is not greater than 450 μm.

9. A mirror according to claim 1, wherein said electrolyte liquid is a solution of an alkali metal compound selected from the group consisting of LiClO4, LiBF4, LiPF6, KClO4, KBF4 and KPF6 in a solvent.

10. A mirror according to claim 9, wherein said solvent is selected from tne group consisting of acetonitrile, propylene carbonate, N,N'-dimethylformamide and water, and mixtures thereof.

11. A mirror according to claim 1, further comprising a transparent spacer which is disposed between said first and second electrochromic layers so as to contact with said first and second electrochromic layers only in limited areas.

12. A mirror according to claim 11, wherein said spacer comprises a plurality of glass spheres which are substantially uniform in diameter.

13. A mirror according to claim 1 wherein said electrolyte liquid comprises an alkali metal compound in an organic solvent, water, or a mixed solvent system which includes water.

14. A mirror according to claim 13 wherein said alkali metal compound comprises $LiClO_4$, $LiBF_4$, $LiBF_6$, $KClO_4$, $KBF_4$ or $KPF_6$.

* * * * *